United States Patent
Shiraishi et al.

(10) Patent No.: US 9,923,250 B2
(45) Date of Patent: Mar. 20, 2018

(54) HEAT QUANTITY CONTROL DEVICE

(71) Applicant: DENSO CORPORATION, Kariya, Aichi-pref. (JP)

(72) Inventors: Yoshihiko Shiraishi, Kariya (JP); Atusi Sakaida, Kariya (JP); Toshihisa Taniguchi, Kariya (JP); Norio Gouko, Kariya (JP); Yoshitaro Yazaki, Kariya (JP); Motoki Shimizu, Kariya (JP); Eijirou Miyagawa, Kariya (JP); Yasuhiro Tanaka, Kariya (JP); Toshikazu Harada, Kariya (JP); Keita Saitou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 153 days.

(21) Appl. No.: 14/895,840

(22) PCT Filed: Apr. 30, 2014

(86) PCT No.: PCT/JP2014/062004
§ 371 (c)(1),
(2) Date: Dec. 3, 2015

(87) PCT Pub. No.: WO2014/196290
PCT Pub. Date: Dec. 11, 2014

(65) Prior Publication Data
US 2016/0141733 A1 May 19, 2016

(30) Foreign Application Priority Data

Jun. 4, 2013 (JP) .................................. 2013-117753
Oct. 30, 2013 (JP) .................................. 2013-225558

(51) Int. Cl.
*H02J 7/00* (2006.01)
*H01M 10/63* (2014.01)
(Continued)

(52) U.S. Cl.
CPC ............ *H01M 10/63* (2015.04); *G01K 17/00* (2013.01); *G01K 17/20* (2013.01);
(Continued)

(58) Field of Classification Search
CPC ...................................................... H02J 7/007
(Continued)

(56) References Cited

U.S. PATENT DOCUMENTS 6,075,346 A    6/2000   Kikuchi et al.
9,659,416 B2 * 5/2017   Tanaka .................... G07C 5/08
(Continued)

FOREIGN PATENT DOCUMENTS

CN    102324590 A    1/2012
JP    H04029021 A    1/1992
(Continued)

OTHER PUBLICATIONS

International Search Report (in Japanese with English Translation) for PCT/JP2014/062004, dated Aug. 5, 2014; ISA/JP.
(Continued)

*Primary Examiner* — Suchin Parihar
(74) *Attorney, Agent, or Firm* — Harness, Dickey & Pierce, P.L.C.

(57) ABSTRACT

A heat quantity control device has a heat flux sensor arranged between first and second heating elements arranged adjacently to each other, and a control section for controlling a heat quantity of the first and second heating elements. The heat flux sensor has an insulation board made of thermoplastic resin, first and second via holes formed in the insulation board penetrating in a thickness direction thereof. First and second layer connection members are embedded in the first and second via holes, respectively. The first and second layer connection members are made of different metals and alternately connected in series. The control
(Continued)

section controls a heat quantity generated in the first and second heating elements based on the electromotive force generated in the heat flux sensors so that a heat flux flowing between the first and second heating elements becomes not more than a predetermined value.

10 Claims, 12 Drawing Sheets

(51) Int. Cl.
    *G01K 17/20*     (2006.01)
    *H01M 10/625*     (2014.01)
    *G01K 17/00*     (2006.01)
    *H01M 10/0525*     (2010.01)
    *H01M 10/44*     (2006.01)

(52) U.S. Cl.
    CPC ..... *H01M 10/0525* (2013.01); *H01M 10/443* (2013.01); *H01M 10/625* (2015.04); *H02J 7/007* (2013.01); *H01M 2220/20* (2013.01)

(58) Field of Classification Search
    USPC ........................................................ 320/136
    See application file for complete search history.

(56) References Cited

U.S. PATENT DOCUMENTS

2004/0232891 A1* 11/2004 Kimoto ............... H01M 2/1077
    320/150
2008/0226969 A1* 9/2008 Fattig ................ H01M 10/4207
    429/90
2015/0144171 A1 5/2015 Taniguchi et al.
2016/0125671 A1* 5/2016 Tanaka .................. B60R 16/023
    701/33.9

FOREIGN PATENT DOCUMENTS

| | | |
|---|---|---|
| JP | H11187577 A | 7/1999 |
| JP | H11353034 A | 12/1999 |
| JP | 2003194606 A | 7/2003 |
| JP | 2006066299 A | 3/2006 |
| JP | 2006073501 A | 3/2006 |
| JP | 2009192431 A | 8/2009 |
| JP | 2011174851 A | 9/2011 |
| JP | 2012192431 A | 10/2012 |
| JP | 2013019712 A | 1/2013 |
| JP | 2013-089296 A | 5/2013 |
| JP | 2014007376 A | 1/2014 |
| JP | 2014007408 A | 1/2014 |
| JP | 2014007409 A | 1/2014 |
| JP | 2015-014584 A | 1/2015 |
| JP | 2015-014585 A | 1/2015 |

OTHER PUBLICATIONS

Office Action in Corresponding TW Application No. 103116239 dated Jul. 14, 2015 (in Chinese with English Translation).

International Preliminary Report on Patentability dated Dec. 17, 2015 for corresponding PCT Application No. PCT/JP2014/062004 with English translation.

* cited by examiner

HEAT QUANTITY CONTROL DEVICE

CROSS REFERENCE TO RELATED APPLICATIONS

This application is a U.S. National Phase Application under 35 U.S.C. 371 of International Application No. PCT/JP2014/062004 filed on Apr. 30, 2014 and published in Japanese as WO 2014/196290 A1 on Dec. 11, 2014. This application is based on and claims the benefit of priority from Japanese Application No. 2013-117753 filed on Jun. 4, 2013 and Japanese Application No. 2013-225558 filed on Oct. 30, 2013. The entire disclosures of all of the above applications are incorporated herein by reference.

BACKGROUND

Technical Field

The present invention relates to heat quantity control devices capable of controlling a heat quantity generated in heating elements.

Background Art

For example, a conventional heat quantity control device detects a temperature of a heating element, and adjusts a heat quantity generated in the heating element on the basis of the detected temperature of the heating element. (For example, see a patent document 1.)

PTL 1 JP H11-353034

In order to control heating elements, stacked together to form a lamination, to have a same inside heat quantity (or a same inside temperature), the conventional techniques use in general a temperature sensor mounted to each of the heating elements, and adjust a heat quantity generated in each of the heating element on the basis of the detected temperature of each of the heating elements.

SUMMARY

However, each of the heating elements receives a different external influence because of being arranged in a difference location. For example, because a heating element arranged at an outermost position is more strongly influenced by an external temperature when at least three heating elements are stacked to form a lamination, the outermost heating element radiates a large amount of heat energy outside, and this greatly reduces a surface temperature of the outermost heating element. On the other hand, a heating element arranged inside of the outermost heating element radiates heat energy less than the heat energy of the outermost heating element, and this increases a temperature of the inside heating element because the presence of the outermost heating element prevents radiation of heat energy from the inside heating element. In addition, when two heating elements are stacked together, because each of the heating elements receives a different influence from an ambient temperature and has a different area exposed outside, each of the heating element generates a different discharging energy.

For this reason, even if the heat quantity generated in each of the heating element is adjusted so that a surface temperature of each heating element becomes the same temperature, there is still remained a possible problem of it being difficult for each of the heating elements to have the same inside heat quantity of energy generated in (i.e. the same inside temperature of) each of the heating element. This problem remarkably appears when at least three heating elements are stacked to form a lamination. That is, as previously described, because the inside heating element arranged inside and the outermost heating element arranged at the outermost position have a different discharging value of heat energy, there is a tendency for each of these heating elements to have an uneven inside heat quantity.

The present invention has been completed with a view to addressing the above issues and has an object to provide a heat quantity control device capable of controlling each of heating elements to have an uneven inside heat quantity of energy (inside temperature) generated in each of the heating elements with high accuracy.

In order to achieve the object of the present invention, a heat quantity control device has heat flux sensors (10) and a control section (20). The heat flux sensors (10) are arranged between a first heating element and a second heating element. The first heating element and the second heating element are arranged adjacently to each other. The control section controls a heat quantity generated in at least one of the first heating element and the second heating element. The heat quantity control device has the following features. That is, the heat flux sensor has an insulation board (100) made of a thermoplastic resin. A plurality of first and second via holes (101, 102) is formed in the insulation board so that these via holes pass through a thickness direction of the insulation board. First layer connection members (130) and second layer connection members (140) are embedded in the first and second via holes, respectively. The first layer connection members and the second layer connection members are made of different metals. The first layer connection members and the second layer connection members have a structure in which the first layer connection members and the second layer connection members are alternately connected to each other in series. Further, in the heat flux sensor, a front surface protection member (110) is formed on a surface (100a) of the insulation board, a front surface pattern (111) is formed on the front surface protection member (110), and a back surface protection member (120) is formed on a back surface (100b) of the insulation board, a back surface pattern (121) is formed on the back surface protection member (120), and the back surface protection member, the insulation board and the front surface protection member are assembled together.

The first layer connection members and the second layer connection members generate an electromotive force due to a heat flux flowing between the first heating element and the second heating element.

The control section controls a heat quantity generated in the first and second heating elements on the basis of the electromotive force generated in the heat flux sensors so that the heat flux flowing between the first heating element and the second heating element becomes not more than a predetermined value.

The heat flux sensor in the heat quantity control device according to the present invention has an insulation board (100) made of a thermoplastic resin. A plurality of first via holes (101) and second via holes (102) is formed in the insulation board so that the via holes pass through a thickness direction of the insulation board. First layer connection members (130) and second layer connection members (140) are embedded in the first via holes and the second via holes, respectively. The first layer connection members and the second layer connection members are made of different metals. The first layer connection members and the second layer connection members are alternately connected in series. At least one metal forming the first layer connection members and the second layer connection members is a sintered alloy having a structure in which a plurality of metal atoms has been sintered while maintaining a crystal structure of the metal atoms. The first layer connection members and the second layer connection members alternately connected to each other generate an electromotive force due to a heat flux flowing between the first heating element and the second heating element. The control section controls a heat quantity generated in the first heating element and the second heating element on the basis of the electromotive force generated in the heat flux sensor so that the heat flux flowing between the first heating element and the second heating element becomes not more than a predetermined value.

In the heat quantity control device according to the present invention, a heat flux sensors (10) is arranged between a first heating element and a second heating element. The first heating element and the second heating element are arranged adjacently to each other. A temperature sensor (11) is mounted on one of the first heating element and the second heating element, and is capable of detecting a surface temperature of one of the first heating element and the second heating element. A control section (20) is capable of controlling a heat quantity of one of the first heating element and the second heating element. The heat flux sensor has an insulation board (100) made of a thermoplastic resin, a plurality of first via holes (101) and second via holes (102) is formed in the insulation board so that the via holes pass through a thickness direction of the insulation board, first layer connection members (130) and second layer connection members (140) are embedded in the first via holes and the second via holes, respectively, the first layer connection members and the second layer connection members are made of different metals. The first layer connection members and the second layer connection members are alternately connected in series, and the first layer connection members and the second layer connection members alternately connected to each other generate an electromotive force due to a heat flux flowing between the first heating element and the second heating element. The control section controls a heat quantity of one of the first heating element and the second heating element so that the temperature detected by the temperature sensor and a target temperature becomes not more than a predetermined value, and controls a heat quantity generated in the other element in the first heating element and the second heating element on the basis of the electromotive force generated in the heat flux sensors so that the heat flux flowing between the first heating element and the second heating element becomes not more than a predetermined value.

According to the present invention, the control section adjusts a heat quantity generated in at least one of the first and second heating elements so that a heat flux flowing between the first heating element and the second heating element becomes not more than the predetermined value, i.e. no difference in inside heat quantity (inside temperature) between the first heating element and the second heating element occurs. This makes it possible for the control section to perform an equalization control of the inside heat quantity generated in each of the first heating element and the second heating element with high accuracy.

In addition, according to the invention, at least one metal forming the first layer connection members and the second layer connection members is a sintered alloy having a structure in which a plurality of metal atoms has been sintered while maintaining a crystal structure of the metal atoms. This structure makes it possible to increase an electromotive power generated in the first layer connection members and the second layer connection members alternately connected in series, and provide the heat flux sensor with a high sensitivity. It is possible to perform the equalization control of the inside heat quantity of each of the heating elements by using the heat flux sensor having a high sensitivity.

Further, the present invention has a first heat flux sensor (10a), a second heat flux sensor (10b) and a control section (20). The first heat flux sensor is arranged between a first heating element and a second heating element formed adjacently to each other. The first heating element, the second heating element and a third heating element are stacked. The second heat flux sensor is arranged between the second heating element and the third heating element formed adjacently to each other. The control section is capable of controlling a heat quantity of the first heating element, the second heating element and the third heating element. The heat quantity control device has the following features.

That is, according to the invention, a plurality of via holes such as first and second via holes (101, 102) are formed in the insulation board (100) made of thermoplastic resin in a thickness direction of the insulation board (100). The first via holes and the second via holes penetrate the insulation board in the thickness direction thereof. First layer connection members (130) and the second layer connection members (130) are embedded in the first via holes and the second via holes, respectively. The first layer connection member and the second layer connection member are made of different metals to each other. The first layer connection members and the second layer connection members are alternately arranged and connected together in series.

A front surface protection member (110) is formed on a surface (100a) of the insulation board, a front surface pattern (111) is formed on the front surface protection member (110), and a back surface protection member (120) is formed on a back surface (100b) of the insulation board, a back surface pattern (121) is formed on the back surface protection member (120). The back surface protection member, the insulation board and the front surface protection member are assembled together.

The first layer connection members and the second layer connection members, which are alternately connected in the first heat flux sensor, generate an electromotive force due to a first heat flux between the first heating element and the second heating element. The first layer connection members and the second layer connection members, which are alternately connected in the second heat flux sensor, generate an electromotive force due to a second heat flux flowing between the second heating element and the third heating element. The control section adjusts a heat quantity generated in at least one of the first heating element and the second heating element on the basis of the electromotive force generated in the first heat flux sensor so that the first heat flux becomes not less than the predetermined value. Further, the control section adjusts a heat quantity generated in at least one of the second heating element and the third heating element on the basis of the electromotive force generated in the second heat flux sensor so that the second heat flux becomes not less than the predetermined value.

According to the invention, a plurality of via holes such as first and second via holes (101, 102) are formed in the insulation board (100) made of thermoplastic resin in a thickness direction of the insulation board (100) in the first heat flux sensor and the second heat flux sensor. The first and second via holes penetrate the insulation board in the thickness direction thereof. First layer connection members (130) and second layer connection members (140) are embedded in the first via holes, and the second via holes, respectively, wherein the first layer connection member and the second layer connection member are made of different metals to each other. The first layer connection members and the second layer connection members are alternately arranged and connected together in series. At least one metal forming the first layer connection members and the second layer connection members is a sintered alloy having a structure in which a plurality of metal atoms has been sintered while maintaining a crystal structure of the metal atoms.

The first layer connection members and the second layer connection members, which are alternately connected in the first heat flux sensor, generate an electromotive force due to a first heat flux flowing between the first heating element and the second heating element. The first layer connection members and the second layer connection members, which are alternately connected in the second heat flux sensor, generate an electromotive force due to a second heat flux flowing between the second heating element and the third heating element, the control section adjusts a heat quantity generated in at least one of the first heating element and the second heating element on a basis of the electromotive force generated in the first heat flux sensor so that the first heat flux becomes not less than the predetermined value. The control section adjusts a heat quantity generated in at least one of the second heating element and the third heating element on the basis of the electromotive force generated in the second heat flux sensor so that the second heat flux becomes not less than the predetermined value.

In addition, according to the invention, in a heat quantity control device, a first heat flux sensor (10a) is arranged between a first heating element and a second heating element formed adjacently to each other, where the first heating element, the second heating element and a third heating element being stacked. A second heat flux sensor (10b) is arranged between the second heating element and the third heating element formed adjacently to each other. A temperature sensor (11), mounted on the second heating element, is capable of detecting a surface temperature of the second heating element. A control section (20) controls a heat quantity of the first heating element, the second heating element and the third heating element. Each of the first heat flux sensor and the second heat flux sensor comprises an insulation board (100) made of a thermoplastic resin, a plurality of first via holes (101) and second via holes (102), first layer connection members (130) and second layer connection members (140). The first via holes (101) and second via holes (102) are formed in the insulation board so that the via holes pass through a thickness direction of the insulation board. The first layer connection members (130) and second layer connection members (140) are embedded in the first via holes and the second via holes, respectively. The first layer connection members and the second layer connection members are made of different metals. The first layer connection members and the second layer connection members are alternately connected in series.

The first layer connection members and the second layer connection members alternately connected to each other in the first heat flux sensor generate an electromotive force due to a first heat flux flowing between the first heating element and the second heating element. The first layer connection members and the second layer connection members alternately connected to each other in the second heat flux sensor generate an electromotive force due to a second heat flux flowing between the second heating element and the third heating element.

The control section controls a heat quantity generated in the second heating element so that a difference between the temperature detected by the temperature sensor and the target temperature becomes not more than a predetermined value, controls the heat quantity generated in the first heating element on the basis of the electromotive force generated in the first heat flux sensor so that the first heat flux becomes not more than a predetermined value, and controls the heat quantity generated in the third heating element on the basis of the electromotive force generated in the second heat flux sensor so that the second heat flux becomes not more than a predetermined value.

According to the invention, the heat quantity of the first heating element, the second heating element and the third heating element is adjusted so that the first heat flux flowing between the first heating element and the second heating element, and the second heat flux flowing between the second heating element and the third heating element become not more than the predetermined value, i.e. so that no difference occurs in inside heat quantity between the first heating element, the second heating element and the third heating element, it is possible to perform the equalization control of the inside heat quantity (inside temperature) generated in each of the first heating element, the second heating element and the third heating element with high accuracy.

In addition, according to the invention, because at least one metal forming the first layer connection members and the second layer connection members is a sintered alloy having a structure in which a plurality of metal atoms has been sintered while maintaining a crystal structure of the metal atoms, this makes it possible to increase an electromotive force generated in the first layer connection members and the second layer connection members which are alternately connected in series, and to provide the first and second heat flux sensors with a high sensitivity. As previously described, it is possible for the heat quantity control device to use first and second the heat flux sensors with a high sensitivity, and perform the equalization control of the inside heat quantity generated in each of the heating elements with a high accuracy.

Reference numbers and signs in parentheses in each means described in this section and the claims correspond to physical parts which will be explained in the following exemplary embodiments.

DESCRIPTION OF EMBODIMENTS

Next, a description will be given of exemplary embodiments of the present invention with reference to Figures. In the Figures, the same components will be referred with the same reference numbers.

First Exemplary Embodiment

Figure 1:
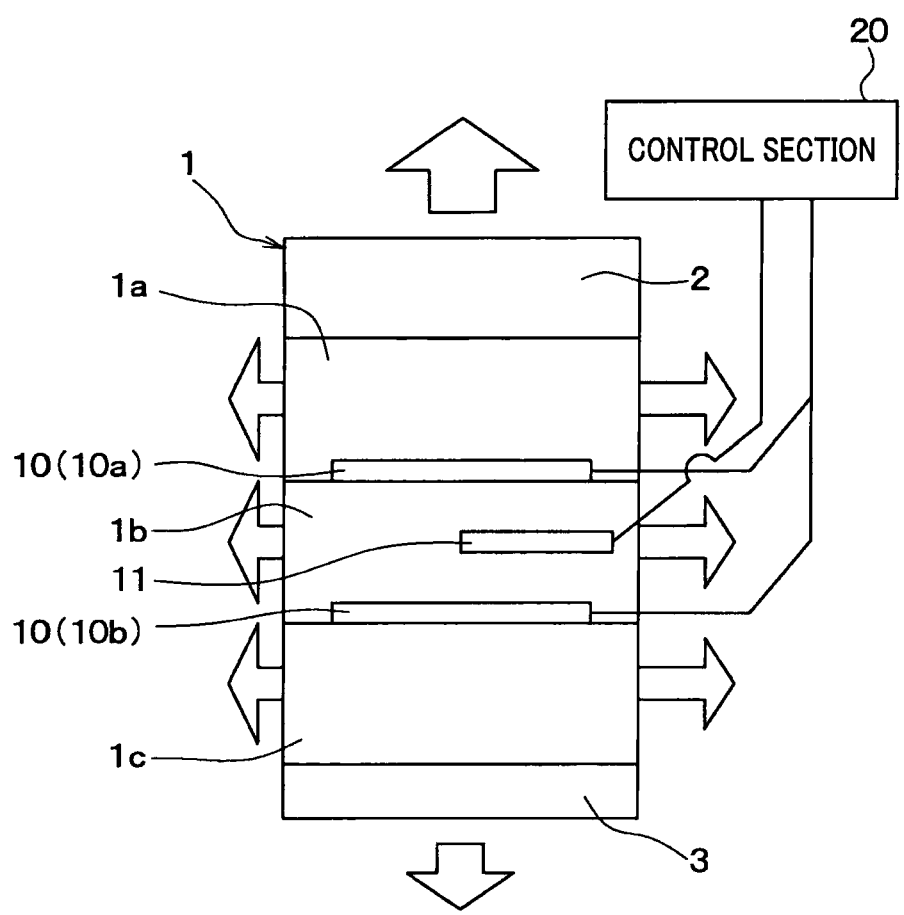
FIG. 1. is a schematic view showing a structure of a heat quantity control device according to a first exemplary embodiment of the present invention.

The heat quantity control device according to a first exemplary embodiment controls a heat quantity of a battery mounted on a motor vehicle. As shown in FIG. 1, the heat quantity control device is equipped with the heat flux sensors 10 and the control section 20.

The battery 1 supplies electric power to electric devices such as a vehicle motor. The battery 1 is composed of a lithium ion battery, a fuel cell, etc. The battery 1 has a structure in which a plurality of battery packs 1a, 1b and 1c are stacked. The first exemplary embodiment provides the battery 1 having a first battery pack 1a, a second battery pack 1b and a third battery pack 1c which are stacked. Each of the first battery pack 1a, the second battery pack 1b and the third battery pack 1c has a structure in which battery cells are stacked. Each of the first battery pack 1a, the second battery pack 1b and the third battery pack 1c is a heating element to generate heat energy when receiving electric power. It is possible to control each of the first battery pack 1a, the second battery pack 1b and the third battery pack 1c to output its electric power, and adjust a heat quantity. No outside air is present between the battery packs adjacently to each other. That is, the battery packs are formed adjacently together, and the heat flux sensor 10 is formed between the battery packs. Discharging plates 2 and 3 are formed on the outside of the battery packs 1a, 1b and 1c in the battery 1. The two battery packs adjacent to each other in the battery packs 1a, 1b and 1c form the first heating element and the second heating element used in the claims. The first battery pack 1a, the second battery pack 1b and the third battery pack 1c form the first heating element, the second heating element and the third heating element.

A temperature sensor 11 is arranged on a surface of the battery pack 1b at a central position between the battery packs 1a, 1b and 1c. The temperature sensor 11 outputs to the control section 2 a sensor signal which corresponds to a surface temperature of the battery pack 1b.

The heat flux sensor 10 is arranged between the battery packs adjacently to each other. It is possible to transfer heat energy between the battery packs which are arranged adjacently to each other through the heat flux sensor 10. The heat flux sensor 10 detects a heat flux between the battery packs arranged adjacently to each other. The present exemplary embodiment uses the first heat flux sensor 10a and the second heat flux sensor 10b. The first heat flux sensor 10a is arranged between the first battery pack 1a and the second battery pack 1b. The second heat flux sensor 10b is arranged between the second battery pack 1b and the third battery pack 1c.

Figure 2:
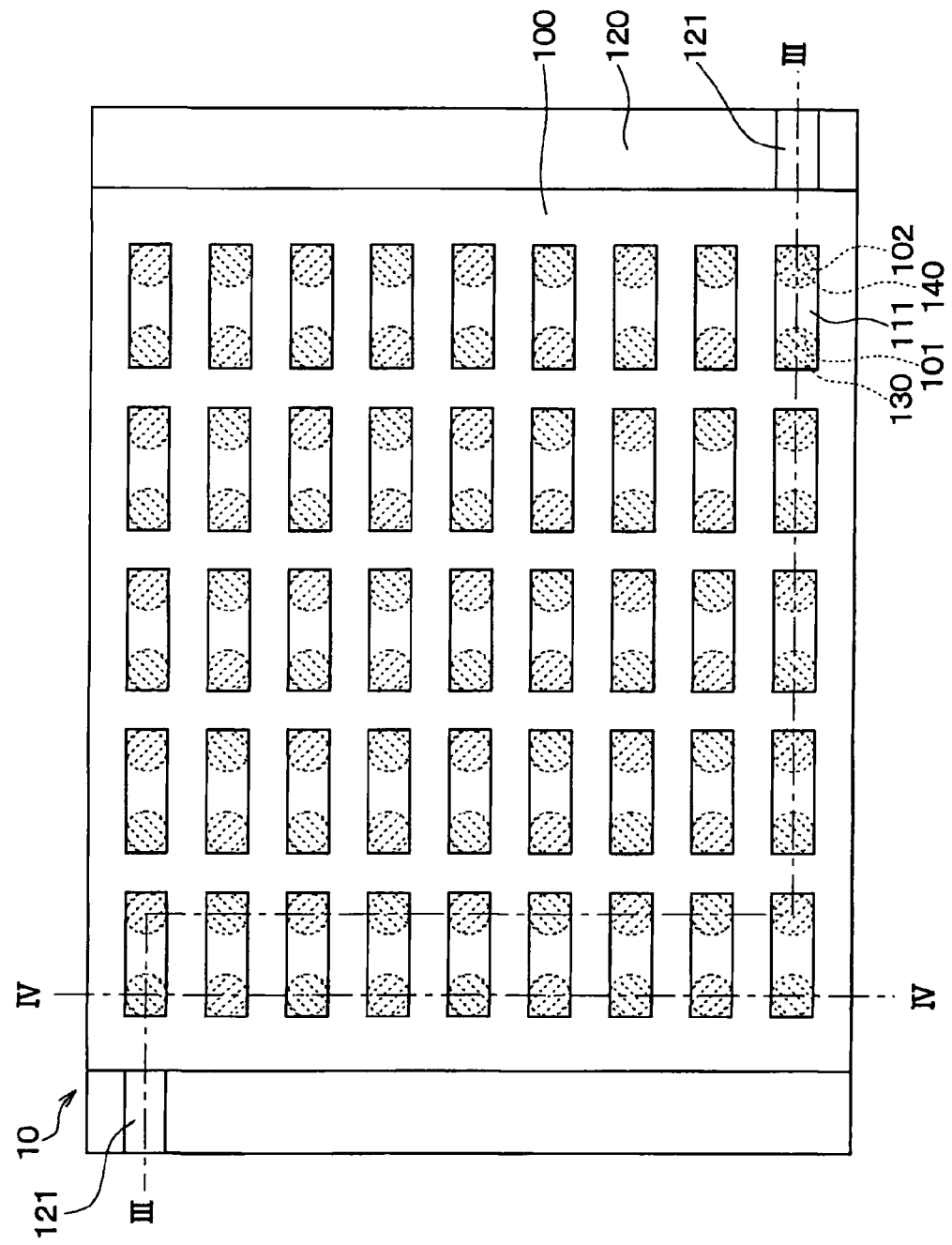
FIG. 2. is a plan view showing a heat flux sensor shown in FIG. 1.
Figure 3:
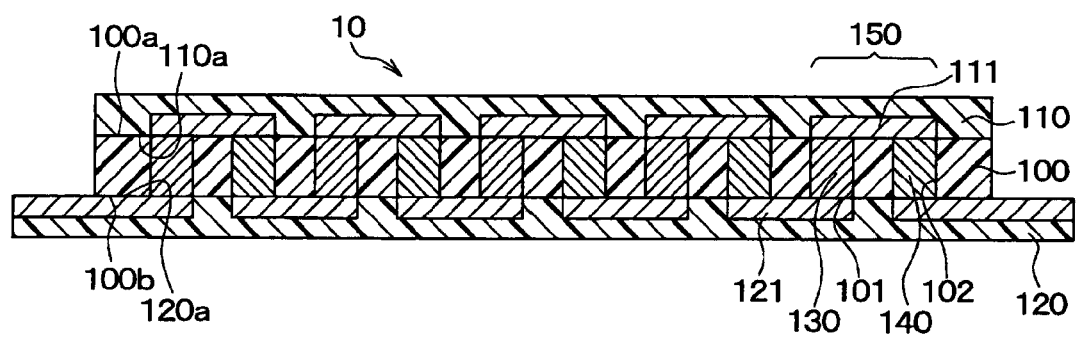
FIG. 3 is a view showing a cross section taken along the line III-III shown in FIG. 2.
Figure 4:
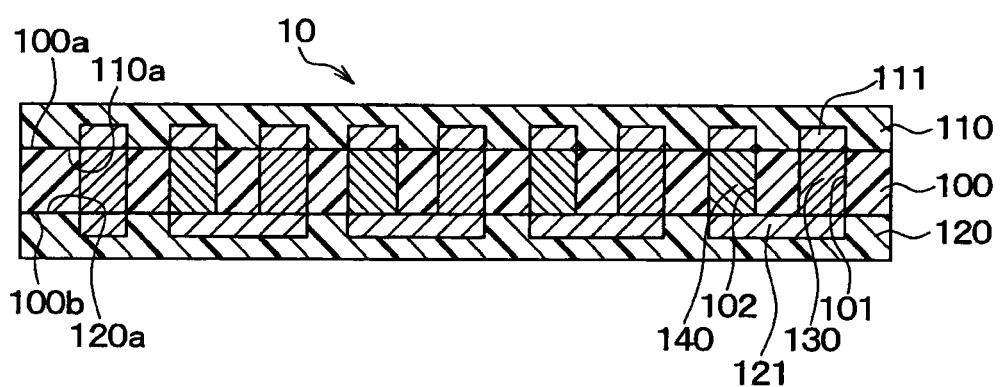
FIG. 4 is a view showing a cross section taken along the line IV-IV shown in FIG. 2.

As shown in FIG. 2 to FIG. 4, the heat flux sensor 10, a front surface protection member 110 and a back surface protection member 120 are assembled together to form an assembly. The first layer connection members 130 and the second layer connection members 140 are alternately connected in series in this assembly. A description will now be given of a structure of the heat flux sensor 10. In particular, the front surface protection member 110 is omitted from FIG. 2 for easy understanding. Although FIG. 2 is a view not showing a cross section, the first layer connection members 130 and the second layer connection members 140 are designated by hatching for easy understanding.

In the present exemplary embodiment, the insulation board 100 has a rectangular shape and is made of thermoplastic resin such as polyether ether ketone (PEEK), poly ether imide (PEI), liquid crystal polymer (LCP), etc. The first via holes 101 and the second via holes 102 are alternately formed in a lattice pattern. The first via holes 101 and the second via holes 102 penetrate the insulation board 100 in a thickness direction thereof.

In the present exemplary embodiment, each of the first via holes 101 and the second via holes 102 has a cylindrical shape having the same diameter, and penetrates the insulation board from the front surface 100a to the back surface 100b thereof. It is also acceptable for each via hole to have a taper shape or a square tube shape. When having a taper shape, a diameter of the via hole is reduced from the front surface 100a to the back surface 100b.

The first layer connection member 130 is arranged in the first via hole 101 and the second layer connection member 140 is arranged in the second via hole 102. That is, the first layer connection members 130 and the second layer connection members 140 are alternately arranged in the insulation board 100.

The first layer connection members and the second layer connection members 130 and 140 are made of different material to each other in order to cause the Seebeck effect. For example, the first layer connection member 130 is made of a metal compound of a solid phase sintering in order to maintain a crystal structure, before performing sintering, of a plurality of metal atoms forming P-type Bi—Sb—Te alloy powder. Further, the second layer connection member 140 is made of a metal compound of a solid phase sintering in order to maintain a crystal structure, before performing sintering, of a plurality of metal atoms forming N-type Bi—Te alloy powder.

The front surface protection member 110 is formed on the front surface 100a of the insulation board 100. The front surface protection member 110 is made of a thermoplastic resin film having a rectangular plane shape such as polyether ether ketone (PEEK), poly ether imide (PEI), liquid crystal polymer (LCP), etc. The front surface protection member 110 has the same plane shape of the insulation board 10. A plurality of front surface patterns 111 is formed to separate from to each other on the surface 119a of the front surface protection member 110 which faces to the insulation board 100. The front surface patterns 111 are made of copper, etc. Each of the front surface patterns 111 is electrically connected to the first layer connection member 130 and the second layer connection member 140.

Specifically, as shown in FIG. 3, when a pair 150 is composed of the first layer connection member 130 and the second layer connection member 140 which are adjacently to each other, the first layer connection member 130 and the second layer connection member 140 forming the pair are connected to the same front surface pattern 111. That is, the first layer connection member 130 and the second layer connection member 140 in each pair 150 are electrically connected to each other through the front surface patterns 111. In the present exemplary embodiment, the pair 150 is composed of one first layer connection member 130 and one second layer connection member 140 which are adjacently to each other along a longitudinal direction (along the left-right direction shown in FIG. 3) of the insulation board 100.

The back surface protection member 120 is formed on the back surface 100b of the insulation board 100. The back surface protection member 120 is made of a thermoplastic resin film having a rectangular plane shape such as polyether ether ketone (PEEK), poly ether imide (PEI), liquid crystal polymer (LCP), etc. The back surface protection member 120 has a length which is longer than the length in the longitudinal direction of the insulation board 100. The back surface protection member 120 is formed on the back surface 100b of the insulation board 100 to project from both the end sections of the insulation board 100.

A plurality of the back surface patterns 121 is formed to separate from to each other on the surface 120a of the back surface protection member 120 which faces to the insulation board 100. The back surface patterns 121 are made of copper, etc. Each of the back surface patterns 121 is electrically connected to the first layer connection member 130 and the second layer connection member 140.

Specifically, as shown in FIG. 3, in the two pairs adjacently to each other in the longitudinal direction of the insulation board 100, the first layer connection member 130 in one pair 150 and the second layer connection member 140 in the other pair are connected together through the same back surface pattern 121. That is, the first layer connection member 130 and the second layer connection member 140 belonging to the adjacent pairs are electrically connected through the same back surface pattern 121.

In addition, as shown in FIG. 4, the first layer connection member 130 and the second layer connection member 140, which are adjacently to each other in a direction (vertical direction shown in FIG. 2) which is perpendicular to the longitudinal direction, are connected to each other through the same back surface pattern 121 at the outer edges of the insulation board 100. In more detail, the first layer connection member 130 and the second layer connection member 140 arranged adjacently to each other are connected to the same back surface pattern 121 so that these members 130 and 140 connected in series through the corresponding front surface pattern 111 and back surface pattern 121 are repeatedly formed in the longitudinal direction of the insulation board 100.

Further, as shown in FIG. 2 and FIG. 3, the end part of the back surface patterns 121 connected in series through the patterns 111 and 121 is formed to be exposed outside from the insulation board 100. This exposed end part of the back surface patterns 121 acts as a terminal which is connected to the control section 20.

The heat flux sensor 10 according to the present exemplary embodiment has the basic structure previously described. The heat flux sensors 10 outputs a sensor signal (electromotive force) to the control section 20. The sensor signal corresponds to a heat flux passing through the heat flux sensor 10 in the thickness direction thereof. When the heat flux changes, the electromotive force generated in the first layer connection members 130 and the second layer connection members 140 alternately connected in series changes due to the change of the electromotive force. The thickness direction of the heat flux sensor 10 is a laminating direction of the insulation board 100, the front surface protection member 110 and the back surface protection member 120.

In the heat flux sensors according to the present exemplary embodiment, it is possible to provide the front surface protection member 110 and the back surface protection member 120 with a high density by adjusting the number of the first via holes 101 and the second via holes 102, a diameter of each of the first via holes 101 and the second via holes 102, a gap between the first via holes 101 and the second via holes 102, etc. This makes it possible to increase the electromotive force generated in the heat flux sensor 10, and allows the heat flux sensor to have a multiple terminals, and a high sensitivity.

The heat flux sensors 10 according to the present exemplary embodiment uses a metal compound (Bi—Sb—Te alloy, Bi—Te alloy) of a solid phase sintering in order to maintain a predetermined crystal structure as the first layer connection members 130 and the second layer connection members 140. That is, the first layer connection members 130 and the second layer connection members 140 are made of a sintered alloy while maintaining the crystal structure of a plurality of metal atoms. This structure makes it possible to increase an electromotive force as a voltage generated in the first layer connection members 130 and the second layer connection members 140 alternately connected in series. It is therefore possible for the heat flux sensor 10 to have a high sensitivity.

Still further, because the heat flux sensor 10 according to the present exemplary embodiment to have a structure in which the first via holes 101 and the second via holes 102 are formed in the insulation board 100 made of thermoplastic resin, it is possible to provide a thin heat flux sensor 10 having a large area. This makes it possible for the heat flux sensor 10 to detect a heat flux with high sensitivity without inhibiting heat transfer between the battery packs arranged adjacently to each other.

A description will now gen given of a manufacturing method of producing the heat flux sensor 10 having the structure previously described with reference to FIG. 5.

Figure 5:
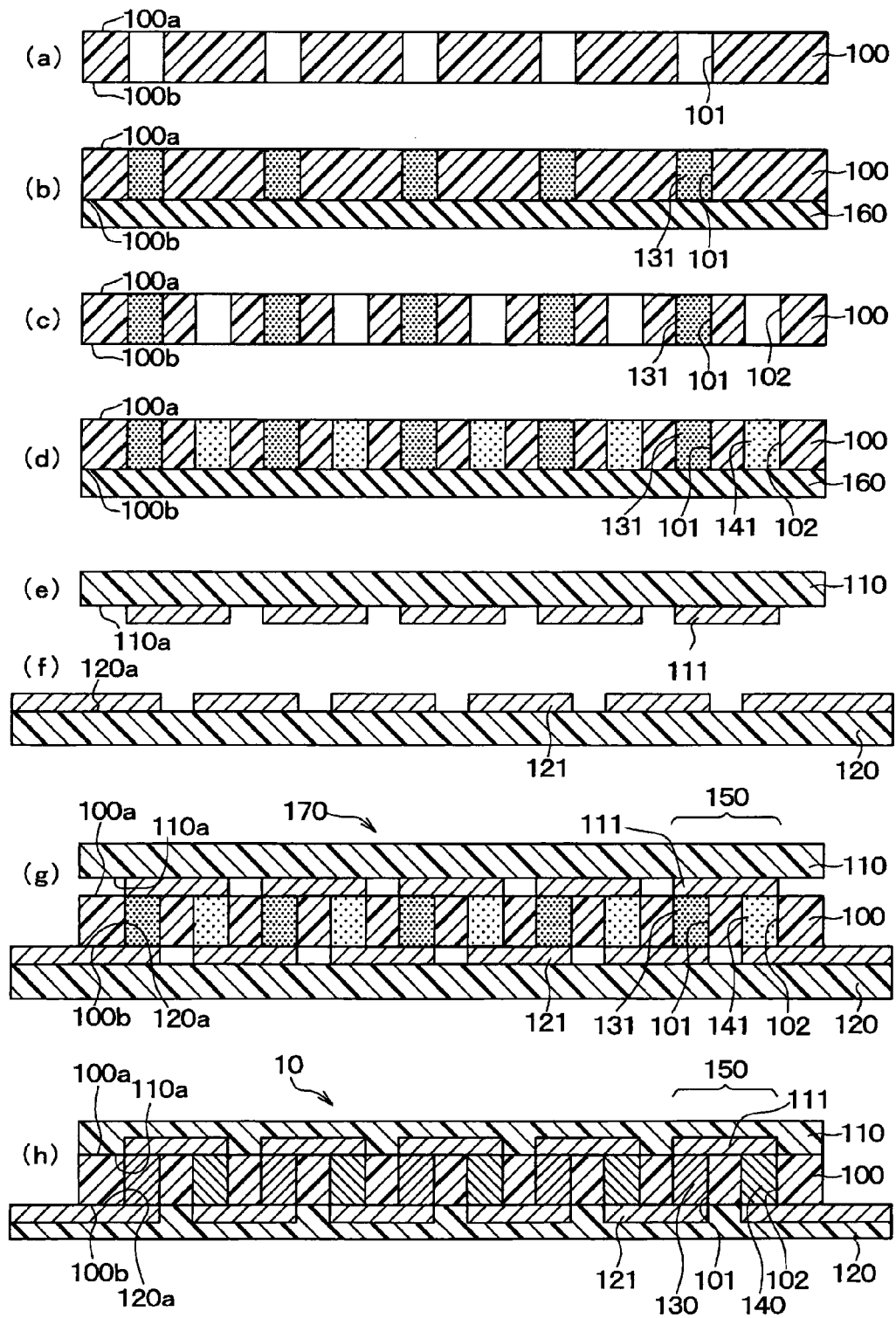
FIG. 5 is a view showing a cross section of a manufacturing steps of producing the heat flux sensor.

As shown in FIG. 5 (a), the insulation board 100 is prepared. A plurality of the first via holes 101 is formed in the insulation board 100 by using a drill or laser, etc.

Next, as shown in FIG. 5 (b), each of the first via holes 101 is filled with a first conductive paste 131. It is preferable to use a method (or a device) of filling the first via holes 101 with the first conductive paste 131, as disclosed in the Japanese patent laid open publication No. 2010-50356 of the same applicant of the present invention.

To explain it briefly, the insulation board 100 is arranged on a holder, which is not shown, through an absorption paper 160 so that the back surface 100b of the insulation board 100 faces the absorption paper 160. The first via holes 101 are filled with the first conductive paste 131 while the first conductive paste 131 is melted. This makes it possible for the absorption paper 160 to absorb a large part of organic solvent in the first conductive paste 131, and as a result, alloy powder is adhered in the first via holes 101.

It is sufficient to use a material as the absorption paper 160 capable of absorbing organic solvent contained in the first conductive paste 131. It is possible to use normal pure paper.

A paste is used as the first conductive paste 131, which is produced by adding organic solvent such as paraffin having a melting point of 43° C. into Bi—Sb—Te alloy powder. A predetermined crystal structure of metal atoms is maintained in the Bi—Sb—Te alloy powder. Accordingly, the filling step of filling the first conductive paste 131 into the first via holes 101 is performed under a condition in which the surface 100a of the insulation board 100 is heated at a temperature of approximately 43° C.

As shown in FIG. 5 (c), a plurality of the second via holes 102 is formed in the insulation board 100 by using a drill or laser, etc. As previously described, the second via holes 102 and the first via holes 101 are alternately formed in the insulation board 100 to make a lattice pattern.

Next, as shown in FIG. 5 (d), each of the second via holes 102 is filled with a second conductive paste 141. It is possible to form the second via holes 102 by the same processes shown in FIG. 5 (b).

That is, the insulation board 100 is arranged on the holder, which is not shown, through an absorption paper 160 so that the back surface 100b of the insulation board 100 faces to the absorption paper 160. The second via holes 102 are filled with the second conductive paste 141. This makes it possible for the absorption paper 160 to absorb a large part of organic solvent in the second conductive paste 141, and as a result, alloy powder is adhered in the second via holes 102.

A paste is used as the second conductive paste 141, which is produced by adding organic solvent such as terpineol having a melting point at room temperature into Bi—Te alloy powder. A predetermined crystal structure of metal atoms is maintained in the Bi—Te alloy powder. That is, such organic solvent forming the second conductive paste 141 has the melting point which is lower than that of the organic solvent forming the first conductive paste 131. The step of filling the second via holes 102 with the second conductive paste 141 is performed under a condition in which the surface 100a of the insulation board 100 is maintained at room temperature. In other words, the filling process is performed to fill the second via holes 102 with the second conductive paste 141 under the condition in which the organic solvent contained in the first conductive paste 131 has been solidified. This makes it possible to suppress the second conductive paste 141 from entering into the first via holes 101.

The organic solvent, which is contained in the first conductive paste 131, but not absorbed by the absorption paper 160, is remained in the first via holes 101 as the solidified state.

In another step, as shown in FIG. 5 (e) and FIG. 5 (f), different from the step previously described, a copper foil, etc. is formed on the surface 110a, 120a of the front surface protection member 110 and the back surface protection member 120 which face the insulation board 100. The patterning of the copper foil is performed to form the front surface patterns 111 and the back surface patterns 121. The front surface patterns 111 are separated from each other. The back surface patterns 121 are separated from each other. The front surface patterns 111 and the back surface patterns 121 are prepared by the patterning of the copper foil.

After this step, as shown in FIG. 5 (g), the back surface protection member 120, the insulation board 100 and the front surface protection member 110 are stacked in order to form a laminated body 170.

In the present exemplary embodiment, the back surface protection member 120 is formed to have a longitudinal length which is longer than the longitudinal length of the insulation board 100 so that both the end sections of the back surface protection member 120 are projected from the insulation board 100.

After this, the laminated body 170 is disposed between a pair of pressing plates (not shown), as shown in FIG. 5 (h). While heating and pressing the laminated body 170 disposed between the pressing plates in the vertical direction under vacuum in order to form the laminated body 170. Specifically, the first conductive paste 131 and the second conductive paste 141 are sintered and solidified to form the first layer connection members 130 and the second layer connection members 140 in the laminated body 170. Further, the laminated body 170 is formed while pressing and heating the first layer connection members 130 and the second layer connection members 140 so that the first layer connection members 130 and the second layer connection members 140 are connected to the front surface patterns 111 and the back surface patterns 121.

It is acceptable to arrange a buffer such as a rock wool paper between the laminated body 170 and the pressing plates when the laminated body 170 is assembled. However, the use of this process is not limited. The heat flux sensor 10 is produced by the manufacturing method previously described.

The control section 20 is a heat quantity control means for controlling the heat quantity of each of the battery packs 1a, 1b and 1c. For example, the control section 20 is comprised an electric control device having a microcomputer, a memory as a memory means, and a peripheral circuits thereof. The control section 20 adjusts the electric energy outputted from each of the battery packs 1a, 1b and 1c, and adjusts the heat quantity of each of the battery packs 1a, 1b and 1c.

Figure 6:
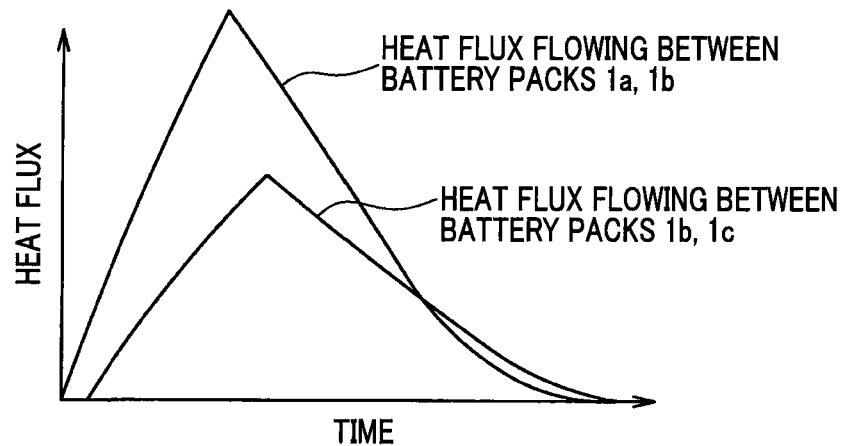
FIG. 6 is a view explaining the equalization control process of inside heat quantity performed by the first exemplary embodiment.

Specifically, as shown in FIG. 6, the control section 20 adjusts the heat quantity of the battery packs adjacently to each other so that a heat flux flowing between the battery packs adjacently to each other becomes zero (equalization control of inside heat quantity). It is sufficient to adjust the heat flux to a value which is not more than a predetermined value near zero. For example, the control section 20 compares an electromotive voltage transmitted from the heat flux sensor 10 with a threshold value, and adjusts the heat quantity of each of the battery packs adjacently to each other so that the electromotive voltage becomes not more than the threshold value.

The control section 20 performs the equalization control of the inside heat quantity (inside temperature) of the battery packs so that the battery 1 generates an electric power while suppressing the entire heat quantity of the battery 1 in order to have a minimum value, for example. In this case, the control section 20 reduces the heat quantity of the battery packs having a larger inside heat quantity in the battery packs 1a, 1b and 1c, and performs the equalization control of the inside heat quantity (inside temperature) of each of the battery packs 1a, 1b and 1c.

In addition, the control section 20 performs the equalization control of the inside heat quantity (inside temperature) during a warm-up operation mode when the battery packs operate under a low temperature condition. This warm-up operation mode is performed before the battery 1 supplies electric power to various electric devices in order for each of the battery packs 1a, 1b and 1c to have a temperature at which each of the battery packs 1a, 1b and 1c outputs electric power stably. The control section 20 performs the control process to increase a temperature of each of the battery packs 1a, 1b and 1c while adjusting the heat quantity of each of the battery packs 1a, 1b and 1c so that each of the battery packs 1a, 1b and 1c has the same inside heat quantity as each other.

Figure 7:
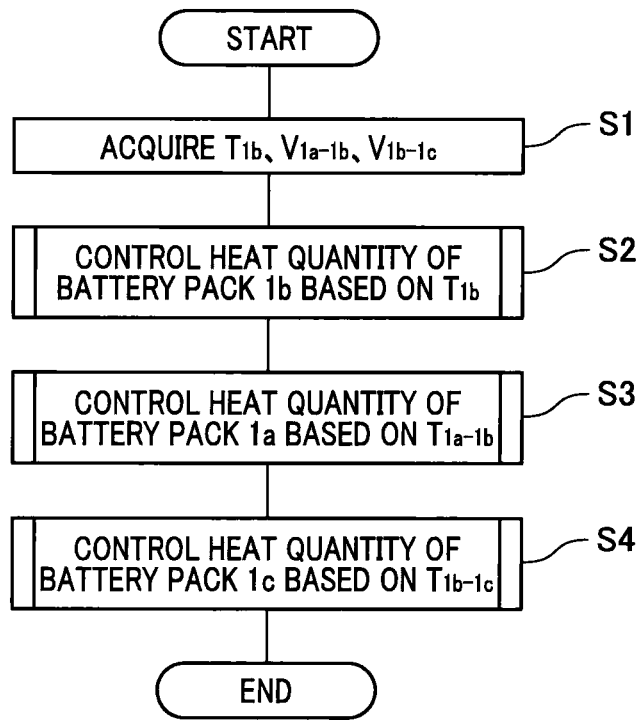
FIG. 7 is a view showing a flow chart of the equalization control of inside heat quantity performed by the heat quantity control device according to the first exemplary embodiment.
Figure 8:
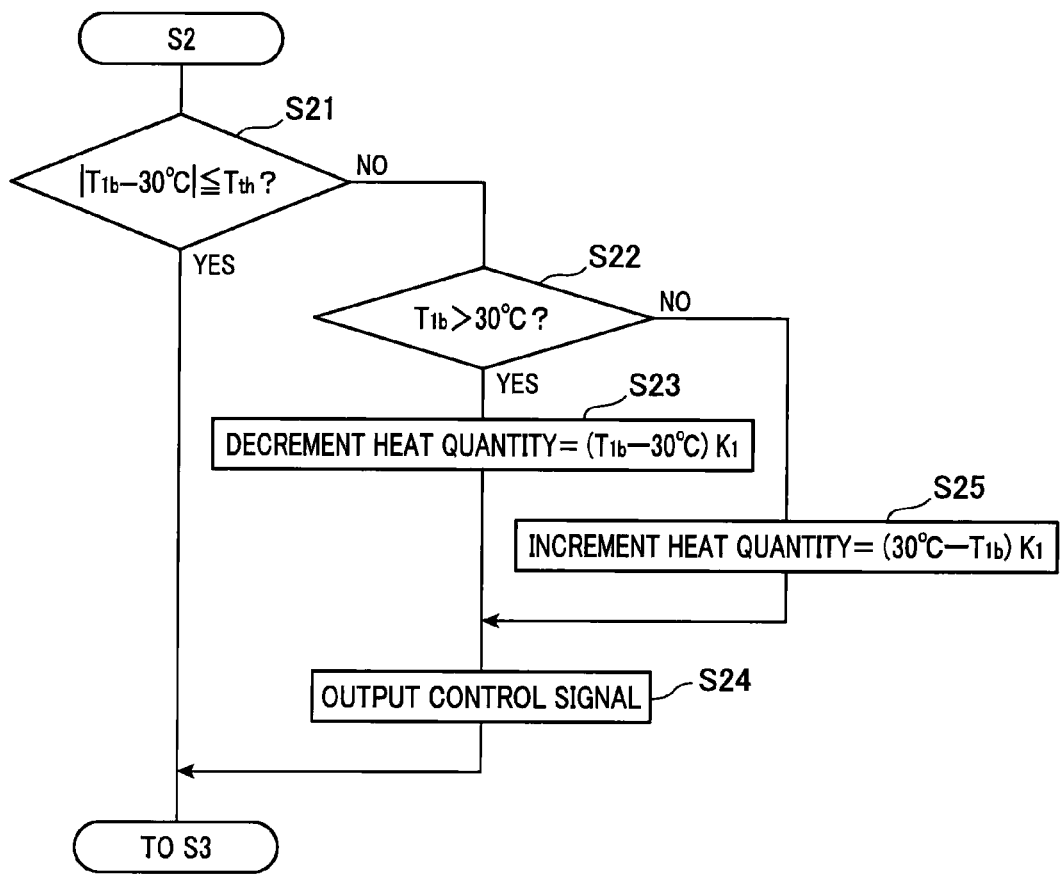
FIG. 8 is a view showing a flow chart of a control process in step S2 shown in FIG. 7.

Specifically, in step S1 shown in FIG. 7, the control section 20 acquires a temperature $T_{1b}$ of the battery pack 1b detected by the temperature sensor 11, a first electromotive voltage $V_{1a-1b}$ detected by the first heat flux sensor 10a arranged between the battery pack 1a and the battery pack 1b, and a second electromotive voltage $V_{1b-1c}$ detected by the second heat flux sensor 10b arranged between the battery packs 1b and the battery pack 1c.

In step S2, the control section 20 controls a heat quantity of the battery pack 1b on the basis of the temperature $T_{1b}$ of the battery pack 1b obtained in step S1.

In step S3, the control section 20 controls the heat quantity of the battery pack 1a on the basis of the first electromotive voltage $V_{1a-1b}$ obtained in step S1.

In step S4, the control section 20 controls the heat quantity of the battery pack 1c on the basis of the second electromotive voltage $V_{1b-1c}$ obtained in step S1.

In the process of controlling the heat quantity control of the battery pack 1b performed in step S2, the control section 20 judges whether or not the absolute value of a difference between the temperature $T_{1b}$ of the battery pack obtained in step S1 and the target temperature becomes not more than a predetermined threshold value $T_{th}$. The battery pack operates stable at the predetermined threshold value $T_{th}$, for example, 300° C. This predetermined threshold value $T_{th}$ is determined so that a difference between the temperature $T_{1b}$ of the battery pack and the target temperature approaches zero. When the judgment result in step S21 indicates affirmation (YES), because it is not necessary to change the heat quantity of the battery pack 1b, the operation flow proceeds to step S3. On the other hand, when the judgment result in step S21 indicates negation (NO), because it is necessary to adjust the heat quantity of the battery pack 1b, the operation flow proceeds to step S22.

In step S22, the control section 20 judges whether it is necessary to reduce or increase the heat quantity. That is, it is detected whether or not the predetermined threshold value $T_{th}$ obtained in step S1 is higher or not the target temperature (30° C.). When the judgment result in step S22 indicates affirmation (YES), because it is necessary to reduce the heat quantity of the battery pack 1b, the control section 20 calculates a decrement heat quantity which is necessary in step S23 to should be reduced.

In step S23, the control section 20 calculates the decrement heat quantity on the basis of the temperature $T_{1b}$ obtained in step S1. For example, the decrement heat quantity is calculated by multiplying a predetermined coefficient $K_1$ and a difference ($T_{1b}$–30° C.) between the temperature $T_{1b}$ obtained in step S1 and the target temperature. Following this, the control section 20 outputs a control signal in step S24 so that the heat quantity of the battery pack 1b decreases by the decrement heat quantity calculated in step S23. The output of the battery pack 1b is adjusted on the basis of the decrement heat quantity. For example, in order to adjust the output of the battery pack 1b, the control section 20 outputs a control signal to another control section capable of adjusting the output of the battery pack 1b. After this, the operation flow proceeds to step S3.

On the other hand, when the judgment result in step S22 indicates negation (NO), because it is necessary to increase the heat quantity of the battery pack 1b, the control section 20 calculates an increment heat quantity which is necessary in step S25 for the battery pack 1b. In step S25, the control section 20 calculates the increment heat quantity on the basis of the temperature $T_{1b}$ obtained in step S1. For example, the increment heat quantity is calculated by multiplying the predetermined coefficient $K_1$ and a difference (30° C.–$T_{1b}$) between the target temperature and the temperature $T_{1b}$ obtained in step S1. Following this, the control section 20 outputs a control signal in step S24 so that the heat quantity of the battery pack 1b increases by the increment heat quantity calculated in step S25. The output of the battery pack 1b is adjusted on the basis of the increment heat quantity. After this, the operation flow proceeds to step S3.

During a period in which the temperature of the battery pack 1b is lower than the target temperature, the heat quantity of the battery pack 1b is increased by the processes in step S22, S25 and S24. When the temperature of the battery pack 1b exceeds the target temperature, the heat quantity of the battery pack 1b is decreased by the processes in step S22, S23 and S24. As previously described, the output of the battery pack 1b is adjusted so that the heat quantity of the battery pack 1b increases and decreases until the temperature $T_{1b}$ of the battery pack 1b approaches the target temperature. On the other hand, when the temperature $T_{1b}$ of the battery pack 1b has approached the target temperature, the output of the battery pack 1b is maintained to keep the heat quantity of the battery pack 1b.

Figure 9:
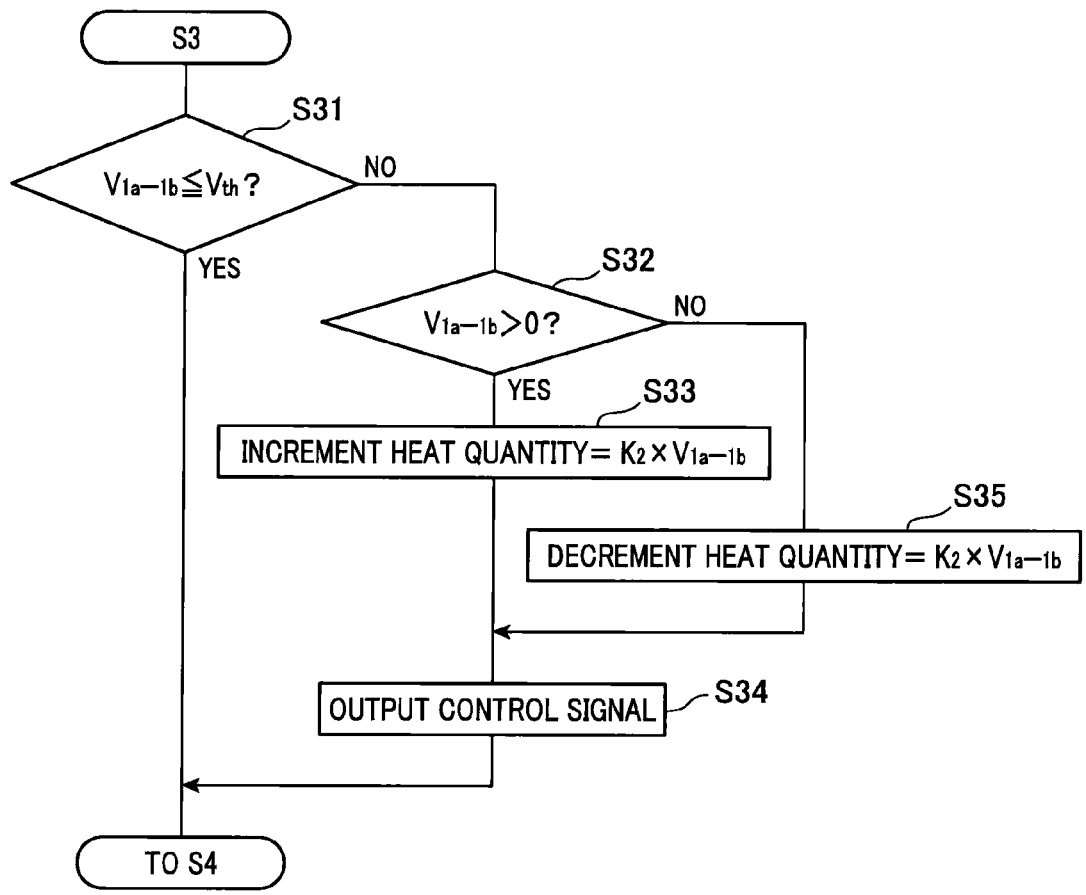
FIG. 9 is a view showing a flow chart of a control process in step S3 shown in FIG. 7.

As shown in FIG. 9, in the process of controlling the heat quantity of the battery pack 1a performed in step S3, the control section 20 judges in step S31 whether or not the first electromotive voltage $V_{1a-1b}$ obtained in step S1 is not more than a threshold voltage $V_{th}$. The threshold voltage $V_{th}$ is determined so that the first electromotive voltage $V_{1a-1b}$ is close to zero. When the judgment result in step S31 indicates affirmation (YES), because it is not necessary to change the heat quantity of the battery pack 1a, the operation flow proceeds to step S4. On the other hand, when the judgment result in step S31 indicates negation (NO), because it is necessary to adjust the heat quantity of the battery pack 1a, the operation flow proceeds to step S32.

In step S32, the control section 20 judges whether it is necessary to reduce or increase the heat quantity. That is, it is detected whether or not the first electromotive voltage $V_{1a-1b}$ obtained in step S1 is a positive value ($V_{1a-1b}$>0). This means that the inside heat quantity of the battery pack 1a is less than the inside heat quantity of the battery pack 1b when the electromotive voltage value is a positive value under the structure in which the heat flux sensor 10a is arranged so that the electromotive voltage value corresponds to the heat flux flowing from the battery pack 1b to the battery pack 1a. Accordingly, when the judgment result in step S32 indicates affirmation (YES), because it is necessary to increase the heat quantity of the battery pack 1a, the control section 20 calculates an increment heat quantity which is necessary in step S33 to should be increased.

In step S33, for example, the control section 20 calculates the increment heat quantity by multiplying the first electromotive voltage $V_{1a-1b}$ obtained in step S1 and a predetermined coefficient $K_2$ together. Following this, the control section 20 outputs a control signal in step S34, like the step S24 so that the heat quantity of the battery pack 1a increases by the increment heat quantity calculated in step S33. The output of the battery pack 1a is adjusted on the basis of the increment heat quantity. After this, the operation flow proceeds to step S4.

On the other hand, when the judgment result in step S32 indicates negation (NO), because it is necessary to reduce the heat quantity of the battery pack 1a, the control section 20 calculates a decrement heat quantity which is necessary in step S35 for the battery pack 1a. In step S35, for example, the control section 20 calculates the decrement heat quantity by multiplying the first electromotive voltage $V_{1a-1b}$ and the predetermined coefficient $K_2$ together. Following this, the control section 20 outputs a control signal in step S34 so that the heat quantity of the battery pack 1a decreases by the decrement heat quantity calculated in step S35. The output of the battery pack 1a changes on the basis of the decrement heat quantity. After this, the operation flow proceeds to step S4.

The processes in step S32, S33 and S34 previously described make it possible to increase the heat quantity of the battery pack 1a during a period in which the inside heat quantity of the battery pack 1a is less than the heat quantity of the battery pack 1b. When the inside heat quantity of the battery pack 1a exceeds the heat quantity of the battery pack 1b, the processes in step S32, S35 and S24 reduce the heat quantity of the battery pack 1a. As previously described, the output of the battery pack 1a is adjusted so that the heat quantity of the battery pack 1a increases and decreases until the inside heat quantity of the battery pack 1a becomes equal to the heat quantity of the battery pack 1b. On the other hand, when the inside heat quantity of the battery pack 1a becomes equal to the heat quantity of the battery pack 1b, the output of the battery pack 1a is maintained so as to maintain the heat quantity of the battery pack 1a.

Figure 10:
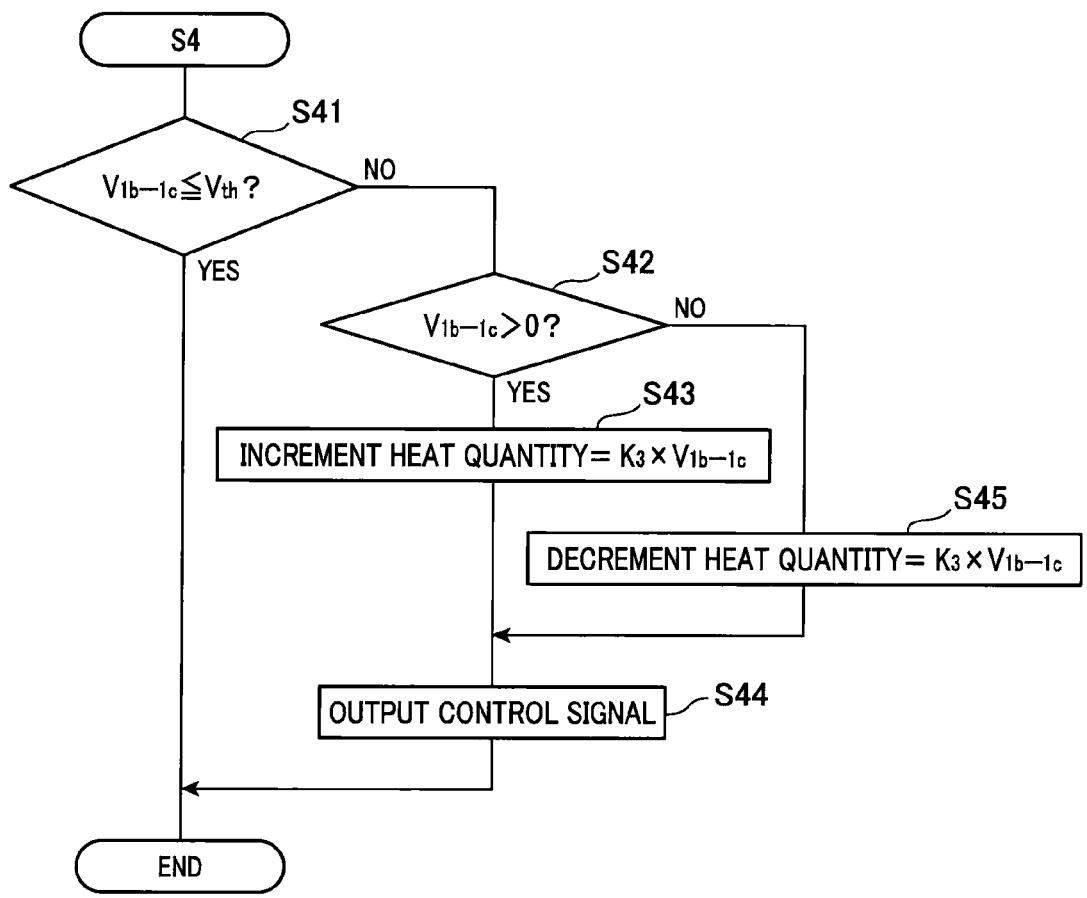
FIG. 10 is a view showing a flow chart of a control process in step S4 shown in FIG. 7.

As shown in FIG. 10, in the heat quantity control of the battery pack 1c performed in step S4, the control section 20 judges in step S41 whether or not the second electromotive voltage $V_{1b-1c}$ obtained in step S1 is not more than the threshold voltage $V_{th}$. This threshold voltage $V_{th}$ is equal to the threshold value $V_{th}$ used in step S31. When the judgment result in step S41 indicates affirmation (YES), because it is not necessary to change the heat quantity of the battery pack 1c, the control process shown in FIG. 7 is completed. The operation flow returns to step S1. On the other hand, when the judgment result in step S41 indicates negation (NO), because it is necessary to change the heat quantity of the battery pack 1c, the operation flow proceeds to step S42.

In step S42, the control section 20 judges whether it is necessary to reduce or increase the heat quantity, that is, detects whether or not the second electromotive voltage $V_{1b-1c}$ obtained in step S1 is a positive value ($V_{1b-1c} > 0$). This means that the inside heat quantity of the battery pack 1c is less than the inside heat quantity of the battery pack 1b when the electromotive voltage value is a positive value under the structure in which the heat flux sensor 10b is arranged so that the electromotive voltage value corresponding to the heat flux flowing from the battery pack 1b to the battery pack 1c. Accordingly, when the judgment result in step S42 indicates affirmation (YES), because it is necessary to increase the heat quantity of the battery pack 1c, the control section 20 calculates an increment heat quantity which is necessary in step S43 to should be increased.

In step S43, for example, the control section 20 calculates the increment heat quantity by multiplying the second electromotive voltage $V_{1b-1c}$ obtained in step S1 and a predetermined coefficient $K_3$ together. Following this, the control section 20 outputs a control signal in step S34, like the step S24 so that the heat quantity of the battery pack 1c increases by the increment heat quantity calculated in step S43. The output of the battery pack 1a is changed on the basis of the increment heat quantity. The control flow shown in FIG. 7 is thereby completed. The operation flow returns to step S1.

On the other hand, when the judgment result in step S42 indicates negation (NO), because it is necessary to reduce the heat quantity of the battery pack 1c, the control section 20 calculates a decrement heat quantity which is necessary in step S45 for the battery pack 1c. In step S45, for example, the control section 20 calculates the decrement heat quantity by multiplying the second electromotive voltage $V_{1b-1c}$ obtained in step S1 and the predetermined coefficient $K_3$ together. Following this, the control section 20 outputs a control signal in step S44 so that the heat quantity of the battery pack 1c decreases by the decrement heat quantity calculated in step S45. The output of the battery pack 1c changes on the basis of the decrement heat quantity.

The processes in step S42, S43 and S44 previously described make it possible to increase the heat quantity of the battery pack 1c during a period in which the inside heat quantity of the battery pack 1c is less than the heat quantity of the battery pack 1b. When the inside heat quantity of the battery pack 1c exceeds the heat quantity of the battery pack 1b, the processes in step S42, S45 and S44 reduce the heat quantity of the battery pack 1c. As previously described, the output of the battery pack 1c is adjusted so that the heat quantity of the battery pack 1c increases and decreases until the inside heat quantity of the battery pack 1c becomes equal to the heat quantity of the battery pack 1b. On the other hand, when the inside heat quantity of the battery pack 1c becomes equal to the heat quantity of the battery pack 1b, the output of the battery pack 1c is maintained so as to maintain the heat quantity of the battery pack 1c.

Figure 11:
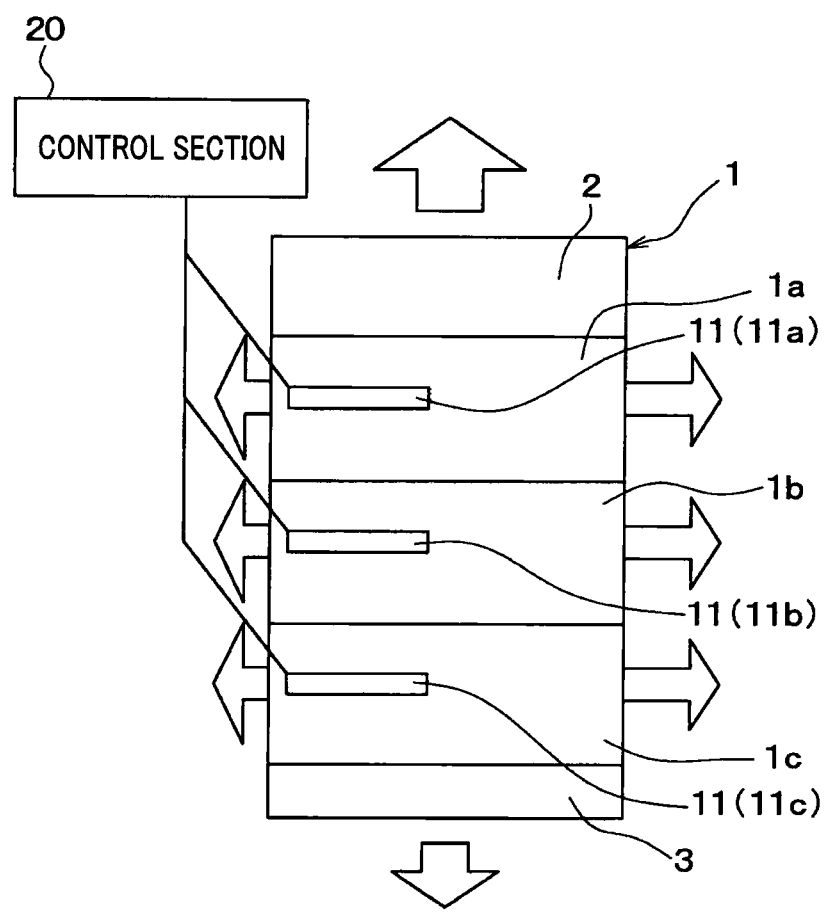
FIG. 11 is a schematic view showing a structure of a heat quantity control device according to a comparative example.

A description will now be given of a comparison between the present exemplary embodiment and a comparative example. The heat quantity control device according to the present exemplary embodiment performs the equalization control of the inside heat quantity (inside temperature). The heat quantity control device according to the comparative example has a structure shown in FIG. 11 and performs an equalization control of the inside heat quantity (inside temperature).

The heat quantity control device as the comparative example is a usual heat quantity control device having a conventional structure explained in the section of [Problem to be solved by the Invention] previously described. In the conventional structure, a surface temperature of each of the battery packs 1a, 1b and 1c is detected by using each temperature sensor 11 (a first temperature sensor 11a, a second temperature sensor 11b and a third temperature sensor 11c), and the heat quantity of each of the battery packs 1a, 1b and 1c is adjusted so that the detection temperature becomes a target temperature. The first, second and third temperature sensors 11a, 11b and 11c are arranged on the surfaces of the battery packs 1a, 1b and 1c, respectively. For example, it can be considered for the heat quantity control device as the comparative example to control the heat quantity of each of the battery packs 1a, 1b and 1c so that the temperatures detected by the temperature sensors 11 become equal to each other in order to equalize the inside heat quantity (inside temperature) of each of the battery packs 1a, 1b and 1c, for example.

However, because a temperature of the surface of each of the battery packs 1a, 1b and 1c detected by each of the temperature sensor 11 is affected by an external ambient temperature in addition to the heat quantity of each of the battery packs 1a, 1b and 1c. That is, the surface temperature of the battery packs 1a and 1c arranged at the outer side of the battery is easily influenced by the external temperature. On the other hand, the surface temperature of the battery pack 1b sandwiched between the battery packs 1a and 1 becomes high because the battery pack 1b radiates a less amount of heat energy because the battery pack 1b is arranged inside. Accordingly, even if the heat quantity of each of the battery packs 1a, 1b and 1c is adjusted so that the surface temperature of each of the battery packs 1a, 1b and 1c becomes equal to each other, it does not always occurs that each of the battery packs 1a, 1b and 1c has the same inside heat quantity (inside temperature).

Figure 12:
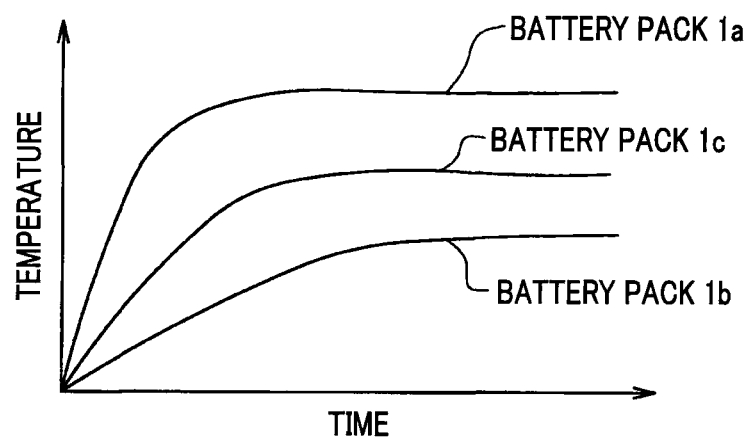
FIG. 12 is a view explaining the equalization control process of the inside heat quantity (inside temperature) performed by the heat quantity control device according to the comparative example.

It can also be considered for the heat quantity control device as the comparative example to control the heat quantity of each of the battery packs 1a, 1b and 1c so that the detection temperature of each of the battery packs 1a, 1b and 1c becomes its target temperature on the basis of a difference in charging heat quantity between the battery packs 1a, 1b and 1c in order to equalize the inside heat quantity (inside temperature) of each of the battery packs 1a, 1b and 1c. For example, as shown in FIG. 12, when a heat radiation energy of the battery pack 1a is larger than a heat radiation energy of the battery pack 1c, and a heat radiation energy of the battery pack 1b has a minimum value which is smaller than a heat radiation energy of the battery pack 1b, the target temperature of the battery packs is increased in the order of the battery pack 1a, the battery pack 1c and the battery pack 1b.

However, in this case, because the temperature of the surface of each of the battery packs 1a, 1b and 1c is changed due to the change of the external temperature, it is necessary to adjust the heat quantity of each of the battery packs 1a, 1b and 1c so that the detection temperature of each of the battery packs 1a, 1b and 1c is maintained to its target temperature.

On the other hand, the heat quantity control device according to the present exemplary embodiment adjusts the heat quantity of the battery packs which are arranged adjacently to each other so that the heat flux flowing between the adjacent battery packs becomes zero. This structure makes it possible to perform the equalization control of the inside heat quantity (inside temperature) of each of the battery packs 1a, 1b and 1c with a high accuracy because of adjusting the heat quantity of the battery packs arranged adjacently to each other to eliminate a difference in inside heat quantity (inside temperature) between the battery packs arranged adjacently to each other becomes zero.

In addition, according to the heat quantity control device according to the present exemplary embodiment, it is not necessary to adjust the heat quantity of each of the battery packs 1a, 1b and 1c even if an external temperature changes because the heat flux flowing between the battery packs arranged adjacently to each other after the inside heat quantity (inside temperature) of each of the battery packs 1a, 1b and 1c has been equal to each other.

Other Exemplary Embodiments

The concept of the present invention is not limited by the exemplary embodiment previously described. It is possible to modify the concept of the present invention as follows within the scope defined in the claims.

(1) In the heat quantity control device according to the first exemplary embodiment, the control section 20 performs the equalization control of the inside heat quantity of the battery packs, compares the electromotive voltage (voltage value) generated in the heat flux sensor with the threshold value, and adjusts the heat quantity of the battery packs arranged adjacently to each other so that the electromotive voltage becomes not more than the threshold value. It is also acceptable for the control section 20 to calculate a heat flux on the basis of the electromotive voltage, and compare the calculated heat flux with the threshold value. Further, it is acceptable to compare a current value generated in the heat flux sensor 10 with a threshold value. In summary, it is sufficient for the heat quantity control device according to the present invention to adjust the heat quantity of the battery packs arranged adjacently to each other on the basis of the electromotive force generated in each of the heat flux sensors.

(2) The heat quantity control device according to the first exemplary embodiment controls the heat quantity of the three battery packs which are stacked. However, the concept of the present invention is not limited by this exemplary embodiment. For example, it is possible for the heat quantity control device to control, like the first exemplary embodiment, the heat quantity of not less than four stacked battery packs, and obtain the same effects of the first exemplary embodiment. In addition, it is also possible for the heat quantity control device to control, like the first exemplary embodiment, the heat quantity of two stacked battery packs, and obtain the same effects of the first exemplary embodiment. When at least three heating elements are stacked, the inside heating element and the outside heating element have a different discharging amount, a heat quantity of each of the heating elements becomes non-equalization to each other. Accordingly, the heat quantity control device according to the present invention can be applied to this case, and perform the equalization control of the heating elements.

(3) The first exemplary embodiment performs the equalization control of an inside heat quantity (inside temperature) of each of the battery packs 1a, 1b and 1c arranged adjacently to each other. However, the concept of the present invention is not limited by the first exemplary embodiment. For example, it is possible for the heat quantity control device according to the present invention to adjust a heat quantity of one battery pack in the pair of the battery packs arranged adjacently to each other.

The first exemplary embodiment has explained the heat quantity control of the battery mounted on a motor vehicle. However, the concept of the present invention is not limited by this. It is possible to apply the present invention to various batteries mounted on houses, factories, etc.

(5) It is possible to apply the heat quantity control device according to the present invention to the heat quantity control of a heating element other than a battery. For example, it is possible to control a heat quantity of the heating element such as a hot plate composed of a plurality of stacked heating elements. It is also possible for the heat quantity control device according to the present invention to adjust a heat quantity of an upper side heating element and a bottom side heating element in a heat press molding machine. In this case, the upper side heating element and the bottom side heating element in the heat press molding machine are adhered adjacently to each other during a press processing of a workpiece. Accordingly, it is sufficient to arrange the heat flux sensors between the upper side heating element and the bottom side heating element during the press processing of the workpiece.

(6) The first exemplary embodiment uses the metal of Bi—Sb—Te alloy and the metal of Bi—Te alloy forming the first layer connection members 130 and the second layer connection members 140, respectively. However, it is possible to use another metal to form them. Further, each of the exemplary embodiments previously described uses the solid-phase sintered alloys which form both the first layer connection members 130 and the second layer connection members 140. However, it is sufficient to use the solid-phase sintered alloy as at least one of the first layer connection members 130 and the second layer connection members 140. This makes it possible to increase the electromotive voltage and provide the heat flux sensors 10 having a high sensitivity when compared with a case in which the first layer connection members 130 and the second layer connection members 140 are made of an alloy other than the solid-phase sintered alloy.

(7) It is not necessary to use elements other than essential components and apparently-theoretically essential components which form the heat quantity control device according to the exemplary embodiments previously described.

Examples of Application

A description will now be given of an application in which the concept of the heat quantity control device according to the present invention is applied to an abnormality monitoring device of an electric furnace facility as a heating element.

That is, the abnormality monitoring device according to an application example has the following features.

The abnormality monitoring device is mounted to a surface of a heating element. The abnormality monitoring device has a heat flux sensor, a temperature sensor, and a judgment means. The heat flux sensor detects a heat flux flowing between the heating element and outside air. The temperature sensor detects a temperature of the outside air. The judgment detects whether or not an abnormality heating of the heating element occurs. In the heat flux sensor, a plurality of first and second via holes is formed in an insulation board so that the first and second via holes penetrate the insulation board in a thickness direction of the insulation board. A first layer connection member is embedded in each of the first via holes and a second layer connection member is embedded in each of the second via holes. The first layer connection members and the second layer connection members are alternately arranged and connected in series. These first layer connection members and the second layer connection members alternately connected in series generate an electromotive force due to a heat flux flowing between the heating element and the outside air. The judgment means judges whether or not an abnormality heating state of the heating element occurs by comparing a detection result of the heat flux sensor with a judgment criteria. This judgment criteria is selected due to the temperature of the outside air from judgment criteria values. These judgment criteria values have been determined per temperature of the outside air when the heating element is working correctly.

The abnormality monitoring device notifies occurrence of the abnormality heating state in the facility by a notification means when detecting the occurrence of the abnormality heating in the facility as the heating element. Further, the abnormality monitoring device performs the process of adjusting the heat quantity of the facility so that the heating state of the facility becomes normal.

Figure 13:
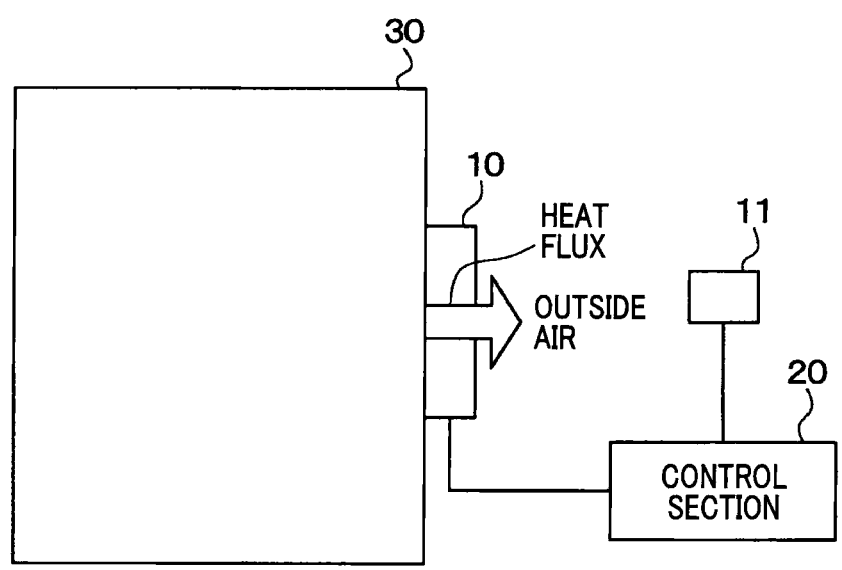
FIG. 13 is a schematic view showing a structure of a heat quantity control device according to a modification of the present invention.

As shown in FIG. 13, the abnormality monitoring device is equipped with the heat flux sensor 10 and the control section 20, like the structure of the heat quantity control device according to the first exemplary embodiment. The heat flux sensor 10 and the control section 20 in the abnormality monitoring device have the same structure of the heat flux sensor 10 and the control section 20 in the heat quantity control device according to the first exemplary embodiment. The heat flux sensor 10 in the abnormality monitoring device is mounted to a surface of the facility 30, which is different from the structure of the first exemplary embodiment, and outputs, to the control section 20, a sensor signal (electromotive voltage) due to the heat flux flowing between the facility 30 and the outside air.

Further, the abnormality monitoring device shown in FIG. 13 is arranged outside of the facility 30, and equipped with a temperature sensor 11, a buzzer (not shown) and display unit (not shown). The temperature sensor 11 outputs, to the control section 2, an output signal corresponding to a temperature of outside air. This buzzer and the display unit are notification means capable of notifying about the abnormality state when the abnormality heating occurs in the facility.

The control section 20 is a judgment means capable of judging whether or not a heat flux flowing between the facility 30 and the outside air exceeds a predetermined value on the basis of a sensor signal transmitted from the heat flux sensor 10. The predetermined value has been determined to have an upper limit value of the heat flux when the facility 30 operates under a normal heating state. When the heat flux flowing between the facility 30 and the outside air becomes not more than the predetermined value, the control section 20 judges that the facility 30 operates under the normal heating state. On the other hand, when the heat flux flowing between the facility 30 and the outside air exceeds the predetermined value, the control section 20 judges that the facility 30 operates in the abnormality state. The control section 20 performs the judgment of detecting occurrence of the abnormality heating state in the facility 30.

When judging the occurrence of the abnormality heating state of the facility 30, the control section 20 instructs the notification means such as the buzzer and the display unit to notify the occurrence of the abnormality heating state of the facility 30. Further, when the control section 20 has the ability to adjust the heat quantity of the facility 30, the control section 30 adjusts the heat quantity of the facility 30 on the basis of the sensor signal transmitted from the heat flux sensor 10 so that the heat flux flowing between the facility 30 and the outside air becomes not more than the predetermined value.

Figure 14:
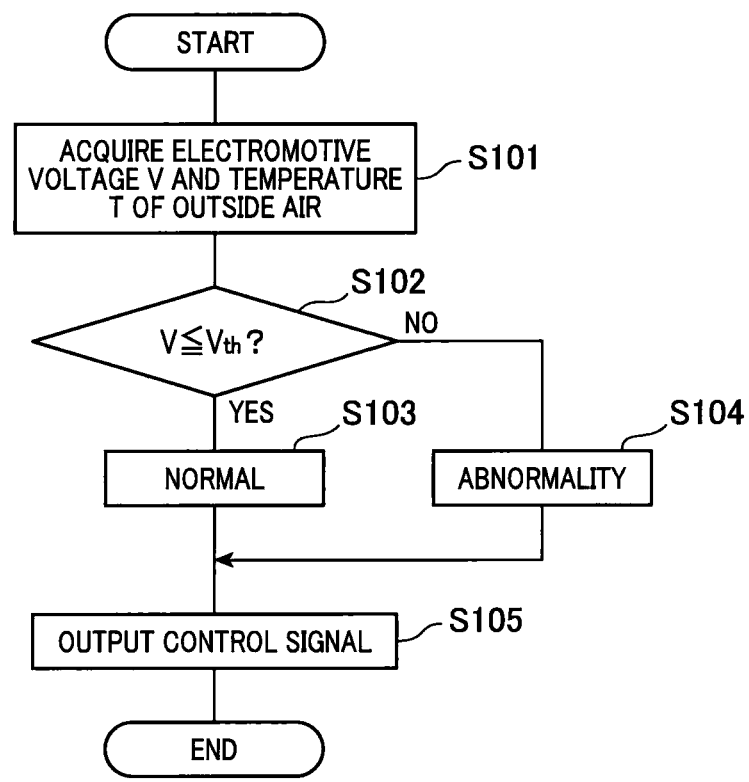
FIG. 14 is a view showing a flow chart of an abnormality monitoring process performed by an abnormality monitoring device as a modification of the present invention.

Specifically, in the flow chart shown in FIG. 14, the control section 20 acquires an electromotive voltage (voltage value) of the heat flux sensor 10 and the temperature T of the outside air detected by the temperature sensor 11 in step S101.

After this, the control section 20 judges whether or not the obtained voltage value V is not more than the threshold value $V_{th}$. This threshold value $V_{th}$ is a judgment criteria which has been determined due to a heat flux detected when the facility 30 operates in the normal heating state. That is, the threshold value $V_{th}$ is a voltage value corresponding to the uppermost value of the heat flux when the facility 30 operates in the normal heating state. Because the heat flux detected when the facility 30 operates in the normal heating state is changed by the temperature of the outside air. Accordingly, when the facility 30 operates in the normal heating state, the relationship between the temperature of the outside air and the heat flux is detected in advance by experiments, etc. and the threshold value $V_{th}$ per temperature of the outside air is stored in advance in a memory section. The control section 20 selects the threshold value $V_{th}$ which corresponds to the temperature T of the outside air detected by the temperature sensor 11, and uses the selected threshold value $V_{th}$ in step S102.

When the judgment result in step S102 indicates affirmation (YES) in step S102, the control section 20 judges in step S103 that the facility 30 operates in the normal heating state. The control flow shown in FIG. 14 is thereby completed.

On the other hand, when the judgment result in step S102 indicates negation (NO) in step S102, the control section 20 judges in step S104 that the facility 30 operates in the abnormality heating state. The control section 20 outputs a control signal to the buzzer and the display unit in step S105 in order to notify the occurrence of the abnormality heating state. This makes it possible for the buzzer and the display unit to notify the occurrence of the abnormality if the facility 30. It is acceptable for the control section 20 to output a control signal to the facility 30 so as to reduce the heat quantity of the facility 30.

By the way, when the abnormality monitoring device detects the temperature of the heating element and judges the occurrence of the abnormality heating state of the facility 30 on the basis of the detected temperature of the heating element, because the temperature of the heating element varies due to the influence of the outside condition, there is a possible problem of it being difficult to detect occurrence of the abnormality heating state of the heating element with high accuracy. For example, when a temperature of the outside air (outside temperature) is low, because the outside air cools the heating element even if the heating element operates in the abnormality heating state, there is a possible case in which the detected temperature of the heating element becomes within the room temperature range. In addition, when a thermal insulation state occurs between the heating element and the outside air, there is a possible case in which the detected temperature of the heating element becomes within an abnormality temperature range even in the heating element operates in the normal heating state. This thermal insulation state indicates a state in which the transfer of heat is suppressed.

On the other hand, the abnormality monitoring device according to the application example of the present invention judges the occurrence of the abnormality heating state of the facility 30 on the basis of the detection result of the heat flux flowing between the facility 30 and the outside air by using the judgment criteria corresponding to the temperature of the outside air. Accordingly, when the facility 30 operates in the normal heating state, the judgment criteria is satisfied. On the other hand, when the facility 30 operates in the abnormality heating state, the judgment criteria is not satisfied. This makes it possible to judge whether the facility operates in the abnormality heating state or the normal heating state with high accuracy.

EXPLANATION OF REFERENCE NUMBERS

10 Heat flux sensors,
20 Control section,
100 Insulation member,
101 and 102 First via holes and Second via holes, and
130 and 140 First layer connection member and Second layer connection member.

What is claimed is:

1. A heat quantity control device comprising:
a heat flux sensor arranged between a first heating element and a second heating element which are arranged adjacently to each other; and
a control section capable of controlling a heat quantity of at least one of the first heating element and the second heating element, wherein
the heat flux sensor comprises an insulation board made of a thermoplastic resin, a plurality of first via holes and second via holes is formed in the insulation board so that the first via holes and the second via holes pass through a thickness direction of the insulation board, first layer connection members and second layer connection members are embedded in the first via holes and the second via holes, respectively, the first layer connection members and the second layer connection members are made of different metals, and the first layer connection members and the second layer connection members are alternately connected in series, and in the heat flux sensor, a front surface protection member is formed on a surface of the insulation board, a front surface pattern is formed on the front surface protection member, and a back surface protection member is formed on a back surface of the insulation board, a back surface pattern is formed on the back surface protection member, and the back surface protection member, the insulation board and the front surface protection member are assembled together, the first layer connection members and the second layer connection members alternately connected to each other generate an electromotive force due to a heat flux flowing between the first heating element and the second heating element, and the control section controls a heat quantity generated in the first heating element and the second heating element on the basis of the electromotive force generated in the heat flux sensor so that the heat flux flowing between the first heating element and the second heating element becomes not more than a predetermined value.

2. The heat quantity control device according to claim 1, wherein the first heating element and the second heating element are battery packs capable of generating heat energy when independently outputting an electric power, respectively, and
the control section adjusts the electric power outputted from each of the battery packs, independently, in order to adjust a heat quantity of each of the battery packs.

3. The heat quantity control device according to claim 1, wherein
the control section controls the heat quantity generated in the first heating element and the second heating element on the basis of the electromotive force generated in the heat flux sensor so that the heat flux flowing between the first heating element and the second heating element becomes equal to or less than the predetermined value.

4. A heat quantity control device comprising:
a heat flux sensor arranged between a first heating element and a second heating element which are arranged adjacently to each other; and
a control section capable of controlling a heat quantity of at least one of the first heating element and the second heating element, wherein
the heat flux sensor comprises an insulation board made of a thermoplastic resin, a plurality of first via holes and second via holes is formed in the insulation board so that the first via holes and the second via holes pass through a thickness direction of the insulation board, first layer connection members and second layer connection members are embedded in the first via holes and the second via holes, respectively, the first layer connection members and the second layer connection members are made of different metals, and the first layer connection members and the second layer connection members are alternately connected in series, and at least one metal forming the first layer connection members and the second layer connection members is a sintered alloy having a structure in which a plurality of metal atoms has been sintered while maintaining a crystal structure of the metal atoms, the first layer connection members and the second layer connection members alternately connected to each other generate an electromotive force due to a heat flux flowing between the first heating element and the second heating element, and the control section controls a heat quantity generated in the first heating element and the second heating element on the basis of the electromotive force generated in the heat flux sensor so that the heat flux flowing between the first heating element and the second heating element becomes not more than a predetermined value.

5. The heat quantity control device according to claim 4, wherein in the heat flux sensor, a front surface protection member is formed on a surface of the insulation board, a front surface pattern is formed on the front surface protection member, and a back surface protection member is formed on a back surface of the insulation board, a back surface pattern is formed on the back surface protection member, and the back surface protection member, the insulation board and the front surface protection member are assembled together.

6. A heat quantity control device comprising:
   a first heat flux sensor arranged between a first heating element and a second heating element which are arranged adjacently to each other, where the first heating element, the second heating element and a third heating element being stacked;
   a second heat flux sensor arranged between the second heating element and the third heating element formed adjacently to each other; and
   a control section capable of controlling a heat quantity of the first heating element, the second heating element and the third heating element,
   wherein a plurality of via holes such as first and second via holes are formed in the insulation board made of thermoplastic resin in a thickness direction of the insulation board in the first heat flux sensor and the second heat flux sensor, the first and second via holes penetrate the insulation board in the thickness direction thereof, first layer connection members and the second layer connection members are embedded in the first via holes and the second via holes, respectively, wherein the first layer connection member and the second layer connection member are made of different metals to each other, the first layer connection members and the second layer connection members are alternately arranged and connected together in series,
   a front surface protection member is formed on a surface of the insulation board, a front surface pattern is formed on the front surface protection member, and a back surface protection member is formed on a back surface of the insulation board, a back surface pattern is formed on the back surface protection member, and the back surface protection member, the insulation board and the front surface protection member are assembled together,
   the first layer connection members and the second layer connection members, which are alternately connected in the first heat flux sensor, generate an electromotive force due to a first heat flux flowing between the first heating element and the second heating element, the first layer connection members and the second layer connection members, which are alternately connected in the second heat flux sensor, generate an electromotive force due to a second heat flux flowing between the second heating element and the third heating element,
   the control section adjusts a heat quantity generated in at least one of the first heating element and the second heating element on a basis of the electromotive force generated in the first heat flux sensor so that the first heat flux becomes not less than the predetermined value, and the control section adjusts a heat quantity generated in at least one of the second heating element and the third heating element on the basis of the electromotive force generated in the second heat flux sensor so that the second heat flux becomes not less than the predetermined value.

7. The heat quantity control device according to claim 6, wherein the first heating element, the second heating element and the third heating element are battery packs capable of generating heat energy when independently outputting an electric power, respectively, and
   the control section adjusts the electric power outputted from each of the battery packs, independently, in order to adjust a heat quantity of each of the battery packs.

8. The heat quantity control device according to claim 6, wherein
   the control section adjusts a heat quantity generated in at least one of the first heating element and the second heating element on a basis of the electromotive force generated in the first heat flux sensor so that the first heat flux becomes equal to or more than the predetermined value, and the control section adjusts a heat quantity generated in at least one of the second heating element and the third heating element on the basis of the electromotive force generated in the second heat flux sensor so that the second heat flux becomes equal to or more than the predetermined value.

9. A heat quantity control device comprising:
   a first heat flux sensor arranged between a first heating element and a second heating element which are arranged adjacently to each other, where the first heating element, the second heating element and a third heating element being stacked;
   a second heat flux sensor arranged between the second heating element and the third heating element formed adjacently to each other; and
   a control section capable of controlling a heat quantity of the first heating element, the second heating element and the third heating element,
   wherein a plurality of via holes such as first and second via holes are formed in the insulation board made of thermoplastic resin in a thickness direction of the insulation board in the first heat flux sensor and the second heat flux sensor, the first and second via holes penetrate the insulation board in the thickness direction thereof, first layer connection members and second layer connection members are embedded in the first via holes, and the second via holes, respectively, wherein the first layer connection member and the second layer connection member are made of different metals to each other, the first layer connection members and the second layer connection members are alternately arranged and connected together in series,
   wherein at least one metal forming the first layer connection members and the second layer connection members is a sintered alloy having a structure in which a plurality of metal atoms has been sintered while maintaining a crystal structure of the metal atoms, the first layer connection members and the second layer connection members, which are alternately connected in the first heat flux sensor, generate an electromotive force due to a first heat flux flowing between the first heating element and the second heating element, the first layer connection members and the second layer connection members, which are alternately connected in the second heat flux sensor, generate an electromotive force due to a second heat flux flowing between the second heating element and the third heating element, the control section adjusts a heat quantity generated in at least one of the first heating element and the second heating element on a basis of the electromotive force generated in the first heat flux sensor so that the first heat flux becomes not less than the predetermined value, and the control section adjusts a heat quantity generated in at least one of the second heating element and the third heating element on the basis of the electromotive force generated in the second heat flux sensor so that the second heat flux becomes not less than the predetermined value.

10. The heat quantity control device according to claim 9, wherein in the first and second heat flux sensors, a front surface protection member is formed on a surface of the insulation board, a front surface pattern is formed on the front surface protection member, and a back surface protection member is formed on a back surface of the insulation board, a back surface pattern is formed on the back surface protection member, and the back surface protection member, the insulation board and the front surface protection member are assembled together.

* * * * *